UNITED STATES PATENT OFFICE.

LOUIS PAUL ANGENARD, OF NEW YORK, N. Y.

IMPROVED METHOD OF MAKING MIRRORS OR LOOKING-GLASSES.

Specification forming part of Letters Patent No. 46,062, dated January 31, 1865; Reissue No. 1,883, dated February 28, 1865.

*To all whom it may concern:*

Be it known that I, LOUIS PAUL ANGENARD, of the city, county, and State of New York, have invented a certain new and useful method of coating the surface of glass for making mirrors or looking-glasses without the use of quicksilver; and I do hereby declare the following to be a full description of the same.

The nature of my invention consists in the use and application of a chemical solution of platina as a substitute for quicksilver for coating the surfaces of glass for making mirrors, or what are generally denominated "looking-glasses," whereby an equally good effect is produced, and at much less cost, and at the same time obviating the pernicious effects of quicksilver on the health of the operatives engaged in this branch of industry.

To enable others skilled in the arts to make and use my invention, I will proceed to set forth the manner in which I prepare the solution of platina and apply the same to the surface of the glass.

I take of pure platina two-thirds of an ounce, muriatic acid two and one-half ounces, nitric acid one and one-sixth ounce. In these acids, when mixed together, I put the platina, and by means of a sand bath or other well-known means I dissolve the platina, after which I let the mixture rest until the acids have entirely evaporated. The residuent is then removed from the retort in which it was dissolved and placed in a mortar or on a pallet of glass or stone, and with a pestle or muller reduced to an impalpable mass. It is then redissolved in alcohol or any other liquid of similar properties, so as to form a liquid solution of the platina. The surface of the glass to which it is to be applied is then made perfectly clean, and then with a suitable brush I wash or coat it over with an even and uniform layer of the dissolved platina. When this is done, I put the glass thus prepared into a muffle furnace or oven and subject the same to heat until it has a cherry-red appearance. The heat is then withdrawn and the glass allowed to remain in the oven until it is cold enough to be removed with safety, when it will be found that the platina has become thoroughly fixed to the surface of the glass, and a mirror produced of equal brilliancy with that of the quicksilver mirror.

It will be obvious that the exact proportions of platina and acids named will be varied according to the extent of area of surface of glass to be covered, and also that slight changes in the proportions of the platina and several acids may be made without materially changing the action of the platina; but such changes I do not deem important as affecting my invention, and therefore do not limit myself to the use of the exact proportions hereinbefore named, so long as I use the solution of platina for the purposes set forth.

Having now described my invention, I will proceed to set forth what I claim and desire to secure by Letters Patent of the United States—

The use and application of a solution of platina as a substitute for quicksilver for coating the surface of glass for making mirrors and looking-glasses, substantially as hereinbefore described.

LOUIS PAUL ANGENARD.

Witnesses:

TIMOTHY BALDWIN, Jr.,

CHARLES L. BARRITT.